(12) United States Patent
Zhou et al.

(10) Patent No.: US 10,351,661 B2
(45) Date of Patent: Jul. 16, 2019

(54) METHOD FOR PRODUCING AN AMINIMIDE

(71) Applicant: PPG Industries Ohio, Inc., Cleveland, OH (US)

(72) Inventors: Hongying Zhou, Allison Park, PA (US); Masayuki Nakajima, Wexford, PA (US); Shanti Swarup, Allison Park, PA (US); Tien-Chieh Chao, Mars, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 300 days.

(21) Appl. No.: 14/964,748

(22) Filed: Dec. 10, 2015

(65) Prior Publication Data
US 2017/0166686 A1  Jun. 15, 2017

(51) Int. Cl.
C08G 59/14 (2006.01)
C08G 59/16 (2006.01)
C08F 210/14 (2006.01)

(52) U.S. Cl.
CPC ........ *C08G 59/1477* (2013.01); *C08F 210/14* (2013.01); *C08G 59/1455* (2013.01)

(58) Field of Classification Search
None
See application file for complete search history.

(56) References Cited

U.S. PATENT DOCUMENTS

| | | | |
|---|---|---|---|
| 3,485,806 A * | 12/1969 | Bloomquist | C07D 213/87 424/70.17 |
| 3,527,802 A | 9/1970 | Slagl et al. | |
| 3,592,784 A | 7/1971 | Brack | |
| 3,628,992 A | 12/1971 | McKillip et al. | |
| 3,641,145 A | 2/1972 | Culbertson et al. | |
| 3,671,473 A | 6/1972 | Sedor et al. | |
| 3,728,387 A | 4/1973 | Freis et al. | |
| 3,756,994 A | 9/1973 | Culbertson et al. | |
| 3,803,220 A | 4/1974 | Gasman | |
| 3,811,887 A | 5/1974 | Ishihara et al. | |
| 3,816,365 A | 6/1974 | Schmid et al. | |
| 3,860,541 A | 1/1975 | Lehmann et al. | |
| 3,893,974 A | 7/1975 | Niino et al. | |
| 3,912,751 A | 10/1975 | Lund | |
| 3,985,807 A | 10/1976 | Grimm et al. | |
| 4,061,845 A | 12/1977 | Fabris et al. | |
| 4,129,607 A | 12/1978 | Kooi et al. | |
| 4,360,649 A | 11/1982 | Kamio et al. | |
| 4,596,844 A | 6/1986 | Oshawa et al. | |
| 4,990,576 A | 2/1991 | Cuscurida et al. | |
| 4,992,089 A | 2/1991 | Cartwright et al. | |
| 5,290,883 A | 3/1994 | Hosokawa et al. | |
| 5,426,169 A | 6/1995 | Starner | |
| 5,705,585 A | 1/1998 | Hogan et al. | |
| 5,734,082 A | 3/1998 | Hogan, Jr. et al. | |
| 5,777,045 A | 7/1998 | Carr | |
| RE37,853 E | 9/2002 | Detering et al. | |
| 6,482,899 B2 | 11/2002 | Ohashi et al. | |
| 6,884,854 B2 | 4/2005 | Schoenfeld et al. | |
| 7,479,534 B2 | 1/2009 | Amano et al. | |
| 7,511,097 B2 | 3/2009 | Frick et al. | |
| 7,547,373 B2 | 6/2009 | Hachikian | |
| 7,635,458 B1 | 12/2009 | Hung et al. | |
| 7,754,184 B2 | 7/2010 | Mercuri | |
| 7,776,303 B2 | 8/2010 | Hung et al. | |
| 7,785,492 B1 | 8/2010 | Jang et al. | |
| 7,790,285 B2 | 9/2010 | Zhamu et al. | |
| 7,824,741 B2 | 11/2010 | Sandhu | |
| 7,842,271 B2 | 11/2010 | Petrik | |
| 7,847,034 B2 | 12/2010 | Bums et al. | |
| 8,047,248 B2 | 11/2011 | Prud'homme et al. | |
| 8,222,324 B2 | 7/2012 | Yamaguchi et al. | |
| 8,430,989 B2 | 4/2013 | Burckhardt et al. | |
| 8,466,238 B2 | 6/2013 | Tamatani et al. | |
| 8,471,065 B2 | 6/2013 | Burton et al. | |
| 8,486,363 B2 | 7/2013 | Hung et al. | |
| 8,673,108 B2 | 3/2014 | Liang et al. | |
| 8,796,361 B2 | 8/2014 | Assay et al. | |

(Continued)

FOREIGN PATENT DOCUMENTS

| | | |
|---|---|---|
| CH | 587897 A5 | 5/1977 |
| CN | 101550325 A | 10/2009 |

(Continued)

OTHER PUBLICATIONS

Bergeron "Production of Carbon by Pyrolysis of Methane in Thermal Plasma", Master's Thesis in Applied Sciences, University of Sherbrooke, Faculty of Applied Sciences, Department of Chemical Engineering, Quebec, Canada, Oct. 1997, 110 pages.

Bobylev, "Epoxy Hardeners", Kompozitny Mir, No. 4, 2006 (7), pp. 20-24.

Cassagneau et al., "Preparation of Layer-by-Layer Self-Assembly of Silver Nanoparticles Capped by Graphite Oxide Nanosheets", J. Phys. Chem. B 1999, 103, pp. 1789-1793.

Coraux, "Growth of Graphene on Ir(111)", New Journal of Physics 11, 2009, 023006, pp. 1-22.

Dato et al., "Substrate-Free Gas-Phase Synthesis of Graphene Sheets", Nano Letters, vol. 8, No. 7, 2008, pp. 2012-2016.

Deselms et al., "Aminimide thermolytic color coupler generating compounds", Research Disclosure No. 159037, Jul. 1977, Questel Ireland Ltd., 8 pages.

Deselms et al., "Base generating aminimides for photographic materials", Research Disclosure No. 157076, May 1977, Questel Ireland Ltd., 6 pages.

(Continued)

*Primary Examiner* — Randy P Gulakowski
*Assistant Examiner* — Ha S Nguyen
(74) *Attorney, Agent, or Firm* — Alicia M. Passerin, Esq.; W. Thomas Babbitt, Esq.

(57) ABSTRACT

Disclosed herein are methods of preparing an aminimide. An epoxy compound is reacted with a hydrazine compound comprising a trivalent nitrogen, and an anhydride functional material or a cyclic compound containing a carbonyl group and at least one heteroatom alpha to the carbonyl group at a temperature greater than 20° C. to form the aminimide. At least one of the epoxy compound and the anhydride functional material or the cyclic compound is polymeric.

10 Claims, No Drawings

(56) References Cited

U.S. PATENT DOCUMENTS

| | | | |
|---|---|---|---|
| 8,968,695 B2 | 3/2015 | Kwon et al. | |
| 9,546,092 B2 | 1/2017 | Aksay et al. | |
| 2004/0072927 A1 | 4/2004 | Hachikian | |
| 2004/0176550 A1 | 9/2004 | McQuaid | |
| 2005/0271574 A1 | 12/2005 | Jang et al. | |
| 2006/0093885 A1 | 5/2006 | Krusic et al. | |
| 2006/0121279 A1 | 6/2006 | Petrik | |
| 2006/0216222 A1 | 9/2006 | Jang | |
| 2006/0252891 A1 | 11/2006 | McQuaid | |
| 2007/0021582 A1 | 1/2007 | Amano et al. | |
| 2007/0045116 A1 | 3/2007 | Hung et al. | |
| 2007/0065703 A1 | 3/2007 | Abd Elhamid et al. | |
| 2007/0191556 A1 | 8/2007 | Eger | |
| 2008/0103340 A1 | 5/2008 | Binder et al. | |
| 2008/0206124 A1 | 8/2008 | Jang et al. | |
| 2008/0220282 A1 | 9/2008 | Jang et al. | |
| 2008/0251202 A1 | 10/2008 | Eagle et al. | |
| 2009/0022649 A1 | 1/2009 | Zhamu et al. | |
| 2009/0048370 A1 | 2/2009 | Lutz et al. | |
| 2009/0068471 A1 | 3/2009 | Choi et al. | |
| 2009/0075035 A1 | 3/2009 | O'Brien et al. | |
| 2009/0110627 A1 | 4/2009 | Choi et al. | |
| 2009/0169467 A1 | 7/2009 | Zhamu et al. | |
| 2009/0294057 A1 | 12/2009 | Liang et al. | |
| 2009/0308534 A1 | 12/2009 | Malone | |
| 2010/0036023 A1 | 2/2010 | Weng et al. | |
| 2010/0047154 A1 | 2/2010 | Lee et al. | |
| 2010/0055017 A1 | 3/2010 | Vanier et al. | |
| 2010/0055025 A1 | 3/2010 | Jang et al. | |
| 2010/0072430 A1 | 3/2010 | Gergely et al. | |
| 2010/0096597 A1 | 4/2010 | Prud'homme et al. | |
| 2010/0104832 A1 | 4/2010 | Messe et al. | |
| 2010/0105834 A1 | 4/2010 | Tour et al. | |
| 2010/0126660 A1 | 5/2010 | O'Hara | |
| 2010/0130655 A1 | 5/2010 | Agarwal et al. | |
| 2010/0247801 A1 | 9/2010 | Zenasni | |
| 2010/0253213 A1* | 10/2010 | Tamatani | C07C 243/40 313/504 |
| 2010/0255219 A1 | 10/2010 | Wenxu et al. | |
| 2010/0280191 A1 | 11/2010 | Dixit et al. | |
| 2010/0301212 A1 | 12/2010 | Dato et al. | |
| 2010/0303706 A1 | 12/2010 | Wallace et al. | |
| 2010/0314788 A1 | 12/2010 | Hung et al. | |
| 2010/0323113 A1 | 12/2010 | Ramappa et al. | |
| 2011/0017955 A1 | 1/2011 | Zhamu et al. | |
| 2011/0070426 A1 | 3/2011 | Vanier et al. | |
| 2011/0076391 A1 | 3/2011 | Gross et al. | |
| 2011/0046289 A1 | 12/2011 | Zhamu et al. | |
| 2012/0095133 A1 | 4/2012 | Vyakaranam et al. | |
| 2012/0114551 A1 | 5/2012 | Coleman | |
| 2012/0128499 A1 | 5/2012 | Desai et al. | |
| 2012/0129980 A1 | 5/2012 | Desai et al. | |
| 2012/0211160 A1 | 8/2012 | Asay et al. | |
| 2012/0237749 A1 | 9/2012 | Aksay et al. | |
| 2012/0256138 A1 | 10/2012 | Suh et al. | |
| 2013/0084236 A1 | 4/2013 | Hung et al. | |
| 2013/0084237 A1 | 4/2013 | Vanier et al. | |
| 2013/0115442 A1 | 5/2013 | Sang et al. | |
| 2014/0150970 A1 | 6/2014 | Desai et al. | |

FOREIGN PATENT DOCUMENTS

| | | | |
|---|---|---|---|
| CN | 102199239 A | | 9/2011 |
| DE | 239336 A1 | | 9/1986 |
| EP | 0364958 A2 | | 10/1989 |
| EP | 2199313 A1 | | 6/2010 |
| EP | 2518103 A2 | | 10/2012 |
| GB | 1373144 | | 11/1974 |
| GB | 1505571 A | | 3/1978 |
| JP | S5054700 A | | 5/1975 |
| JP | S5173031 A | | 6/1976 |
| JP | S54139641 A | | 10/1979 |
| JP | S6123662 A | | 2/1986 |
| JP | S6248720 A | | 3/1987 |
| JP | S6440551 A | | 2/1989 |
| JP | S6440552 A | | 2/1989 |
| JP | 01170614 A | * | 7/1989 |
| JP | H0525354 A | | 2/1993 |
| JP | H06239959 A | | 8/1994 |
| JP | H08269115 A | | 10/1996 |
| JP | H09235354 A | | 9/1997 |
| JP | H10139748 A | | 5/1998 |
| JP | H111635 A | | 1/1999 |
| JP | H11124771 A | | 5/1999 |
| JP | 2000086743 A | | 3/2000 |
| JP | 2003026772 A | | 1/2003 |
| JP | 2003026982 A | | 1/2003 |
| JP | 2003096061 A | | 4/2003 |
| JP | 2006008730 A | | 1/2006 |
| JP | 2012057007 A | | 3/2012 |
| JP | 2012188593 A | | 10/2012 |
| KR | 20040061909 A | | 12/2002 |
| RU | 2346090 A | | 5/2008 |
| RU | 2365608 C2 | | 4/2009 |
| RU | 2496915 A | | 9/2013 |
| SU | 176393 A1 | | 12/1965 |
| WO | 7900448 A1 | | 7/1979 |
| WO | 9518186 A1 | | 7/1995 |
| WO | 9801495 A1 | | 1/1998 |
| WO | 9962335 A1 | | 12/1999 |
| WO | 2010059505 A1 | | 5/2010 |
| WO | 2012006001 A2 | | 1/2012 |
| WO | 2013086277 A2 | | 6/2013 |
| WO | 2015073959 A1 | | 5/2015 |

OTHER PUBLICATIONS

Dresselhaus et al., "Science of Fullerenes and Carbon Nanotubes", Academic Press, Inc., 1996, pp. 60-79.

Du et al., "Facile Synthesis of Highly Conductive Polyaniline/Graphite Nanocomposites", European Polymer Journal 40, 2000, pp. 1489-1493.

Fincke et al., "Plasma Pyrolysis of Methane to Hydrogen and Carbon Black", Industrial and Engineering Chemistry Research, vol. 41, No. 6, 2002, pp. 1425-1435.

Fitzer et al., "Recommended Terminology for the Description of Carbon as a Solid", International Union of Pure and Applied Chemistry, Inorganic Chemistry Division, Pure & Applied Chemistry, vol. 67, No. 3, 1995, pp. 473-506.

Frank et al., "Gravure patterns designed to enhance lateral registration", Research Disclosure No. 157038, May 1977, Questel Ireland Ltd., 2 pages.

Gannon, "Acetylene from Hydrocarbons", Kirk-Othmer Encyclopedia of Chemical Technology, 2003, pp. 1-28.

Gomez De Arco et al., "Synthesis, Transfer, and Devices of Single- and Few-Layer Graphene by Chemical Vapor Deposition", IEEE Transactions on Nanotechnology, vol. 8, No. 2, Mar. 2009, pp. 135-138.

Gonzalez-Aguilar et al., "Carbon Nanstructures Production by Gas-Phase Plasma Processes at Atmospheric Pressure", J. Phys. D, Appl. Phys., vol. 40, No. 8, 2007, pp. 2361-2374.

Holmen et al., "High-Temperature Pyrolysis of Hydrocarbons. 1. Methane to Acetylene", The Norwegian Institute of Technology, University of Trondheim, Ind. Eng. Chem., Process Des. Dev., vol. 15, No. 3, 1976, pp. 439-444.

Khan et al., "Survey of Recent Methane Pyrolysis Literature", Industrial and Engineering Chemistry, vol. 62, No. 10, Oct. 1970, pp. 54-59.

Kim et al., "Fabrication of Graphene Flakes Composed of Multi-Layer Graphene Sheets using a Thermal Plasma Jet System", Nanotechnology 21, Jan. 29, 2010, pp. 1-6.

Kim et al., "Continuous Synthesis of Nanostructured Sheetlike Carbons by Thermal Plasma Decomposition of Methane", IEEE Transactions on Plasma Science, vol. 35, No. 2, Apr. 2007, pp. 434-443.

Kostic et al., "Thermodynamic Consideration of B-O-C-H System for Boron Carbide (B4C) Powder Synthesis in Thermal Plasma", Progress in Plasma Processing of Materials, 1997, pp. 889-898.

Lavoie, "Synthesis of Carbon Black from Propane Using a Thermal

(56) References Cited

OTHER PUBLICATIONS

Plasma", Master's Thesis in Applied Sciences, University of Sherbrooke, Faculty of Applied Sciences, Department of Chemical Engineering, Quebec, Canada, Sep. 1997, 138 pages.

Malesevic et al., "Synthesis of Few-Layer Graphene via Microwave Plasma-Enhanced Chemical Vapour Deposition", Nanotechnology 2008, vol. 19, No. 30, 305604, 6 pages.

McKillip, et al., "The Chemistry of Aminimides", Chemical Reviews, 1973, vol. 73, No. 3, pp. 255-281.

McWilliams, "Graphene: Technologies, Applications, and Markets", BCC Research Report, Feb. 2011, 28 pages.

Niandamuri et al., "Chemical Vapor Deposition of Graphene Films", Nanotechnology 21, 2010, 145604, 4 pages.

Pham et al., "Epoxy Resins", Encyclopedia of Polymer Science and Technology, Jan. 2004, vol. 9, pp. 678-804.

Pristavita et al., "Carbon Blacks Produced by Thermal Plasma: the Influence of the Reactor Geometry on the Product Morphology", Plasma Chem. Plasma Process, 30, 2010, pp. 267-279.

Pristavita et al., "Carbon Nano-Flakes Produced by an Inductively Coupled Thermal Plasma System for Catalyst Applications", Plasma Chem. Plasma Process, 31, 2011, pp. 393-403.

Pristavita et al., "Carbon Nanoparticle Production by Inductively Coupled Thermal Plasmas: Controlling the Thermal History of Particle Nucleation", Plasma Chem. Plasma Process, 31, 2011, pp. 851-866.

Rafiee et al., "Enhanced Mechanical Properties of Nanocomposites at Low Graphene Content", ACSNANO, vol. 3, No. 12, 2009, pp. 3884-3890.

Ratna et al., "Shock-Resistance Ambient Temperature Curing Epoxy Adhesive", J. Adhesion Sci. Technol., 2003, vol. 17, No. 5, pp. 623-632.

Skinner, "Pyrolysis of Methane and the C2 Hydrocarbons", Monsanto Chemical Co., Research and Engineering Division, Dayton 7, Ohio, pp. 59-68.

Song et al., "Properties of Styrene-Butadiene Rubber Nanocomposites Reinforced with Carbon Black, Carbon Nanotube, Graphene, Graphite", Kor. J. Mater. Res. 2010 vol. 20, No. 2, pp. 104-110.

Subrahmanyam et al., "Simple Method of Preparing Graphene Flakes by an Arc-Discharge Method", The Journal of Physical Chemistry C, vol. 113, No. 11, 2009, pp. 4257-4259.

Tang et al., Processible Nanostructured Materials with Electrical Conductivity and Magnetic Susceptibility: Preparation and Properties of Maghemite/Polyaniline Nanocomposite Films, Chem. Mater., 1999, 11, pp. 1581-1589.

Wilson, "Polymeric aminimide antistate", Research Disclosure No. 159014, Jul. 1977, Questel Ireland Ltd., 4 pages.

Zhong et al., "Catalytic Growth of Carbon Nanoballs With and Without Cobalt Encapsulation", Chemical Physics Letters 330, 2000, pp. 41-47.

www.strem.com/uploads/resources/documents/graphene_nanoplatelets, pdf, Apr. 2013, 2 pages.

* cited by examiner

METHOD FOR PRODUCING AN AMINIMIDE

FIELD

Methods for producing an aminimide are disclosed.

BACKGROUND

Many of the known aminimides are monomeric and require registration with specific governmental agencies in the countries in which such substances are used. This registration process is costly and time-consuming, compounded by the fact that different countries may have different standards for registration. Thus, there is a need for polymeric aminimides that avoid the need for registration.

SUMMARY

Disclosed is a method of preparing an aminimide comprising: reacting an (a) epoxy compound, a (b) hydrazine compound comprising a trivalent nitrogen, and an (c) anhydride functional material at a temperature greater than 20° C. to form the aminimide, wherein at least one of the (a) epoxy compound and the (c) anhydride functional material is polymeric. Also disclosed is an aminimide prepared according to the method.

Also disclosed is a method of preparing an aminimide comprising: reacting an (a) epoxy compound, a (b) hydrazine compound comprising a trivalent nitrogen, and a (d) cyclic compound comprising a carbonyl group and at least one heteroatom alpha to the carbonyl group at a temperature greater than 20° C. to form the aminimide, wherein at least one of the (a) epoxy compound and the (d) cyclic compound is polymeric. Also disclosed is an aminimide prepared according to the method.

Also disclosed are aminimides represented by the following formulae:

(formula V)

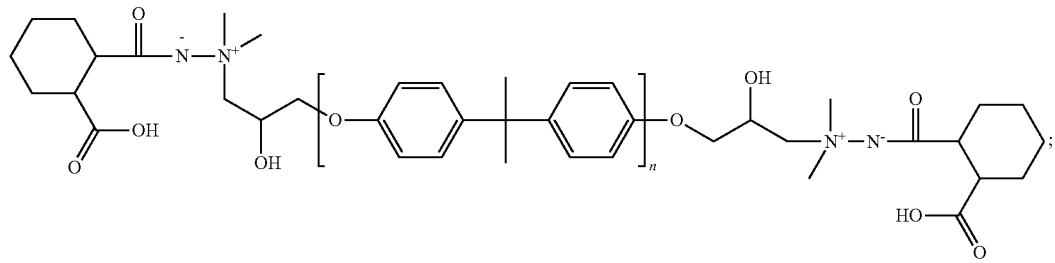

(formula VI)

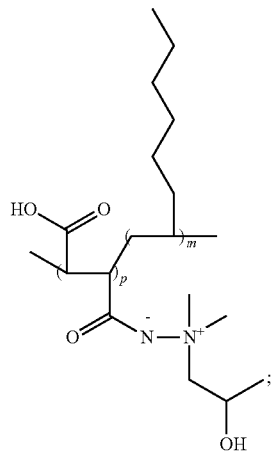

(formula VII)

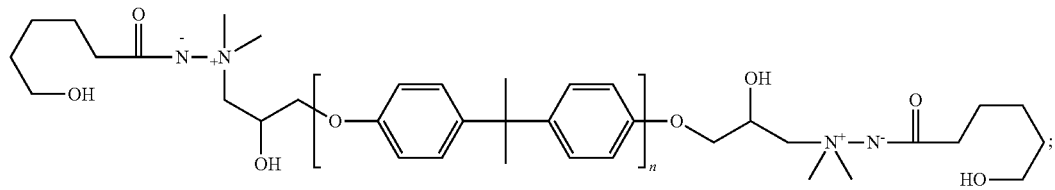

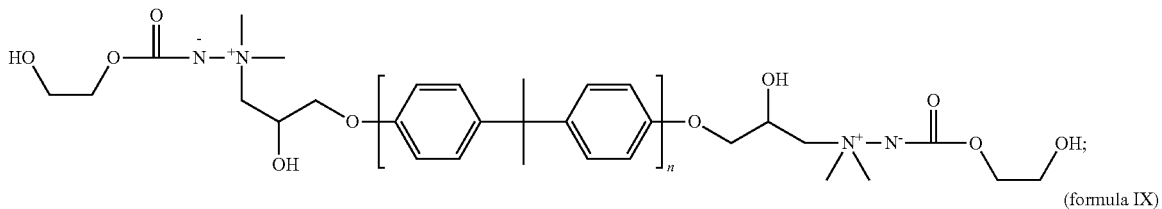

(formula VIII)

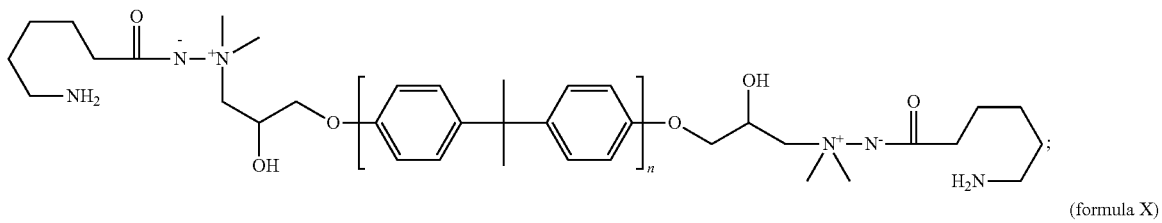

(formula IX)

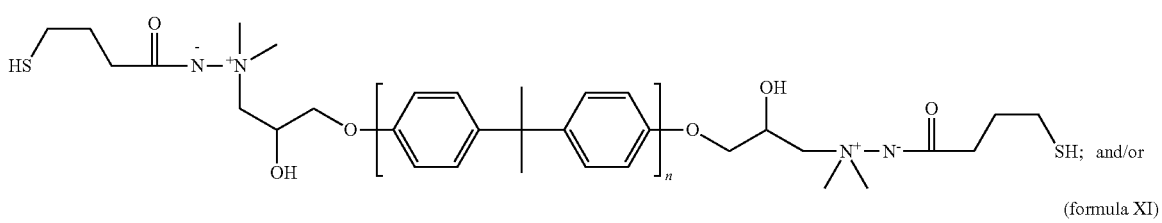

(formula X); and/or (formula XI)

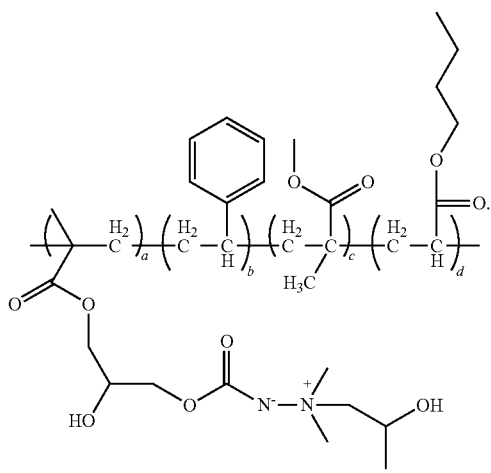

DETAILED DESCRIPTION

For purposes of the following detailed description, it is to be understood that the invention may assume various alternative variations and step sequences except where expressly specified to the contrary. Moreover, other than in any operating examples, or where otherwise indicated, all numbers expressing, for example, quantities of ingredients used in the specification and claims, are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is also understood that, as used herein, a plural term can encompass its singular counterpart and vice versa. For example, although reference is made herein to "a" trivalent nitrogen, "an" anhydride functional material, and "a" cyclic ester, a combination (a plurality) of these components can be used in the present invention.

In addition, in this application, the use of "or" means "and/or" unless specifically stated otherwise, even though "and/or" may be explicitly used in certain instances.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

When referring to any numerical range of values, such ranges are understood to include each and every number and/or fraction between the stated range minimum and maximum.

As used herein, unless indicated otherwise, the term "substantially free" means that a particular material is not purposefully added and is present in a trace amount of 5% or less based on total composition weight.

As used herein, unless indicated otherwise, the term "completely free" means that a composition does not comprise a particular material, i.e., the composition comprises 0% of such material based on total composition weight.

As used herein "monomer" refers generally to a component that can be polymerized with another polymerizable component such as another monomer or a polymer to form a compound that comprises residues of the monomeric or polymeric components, respectively.

As used herein "polymer" refers generally to prepolymers, oligomers, homopolymers, copolymers, or combinations thereof; the prefix "poly" refers to two or more repeating units derived from one or more monomers in the molecule.

As used herein, "(meth)acrylate" includes both acrylate and methacrylate monomers.

As used herein, the term "heteroatom" refers to an oxygen atom, a nitrogen atom, or a sulfur atom.

As used herein, the term "diluent" refers to a material that substantially dissolves the reactants and/or polymers formed therefrom but that is inert with the reactants and/or polymers formed therefrom. The term "substantially dissolve," when used with respect to the diluent, means that the material, i.e. a particular reactant or polymer, becomes incorporated into the diluent so as to form a solution. This means that, according to the present invention, at least 80% of the material may be dissolved in the diluent, or in some cases, at least 90% of the material may be dissolved in the diluent, or in some cases, at least 95% of the material may be dissolved in the diluent based on the total weight of the material in the mixture.

As used herein, the term "aminimide" refers to a molecule, i.e. a monomer or a polymer, that comprises at least one aminimide functional group. As used herein, an "aminimide functional group" comprises an anionic nitrogen bonded to a cationic nitrogen and a carbonyl group according to formula I:

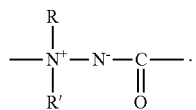

For clarity, an aminimide may comprise additional functional groups in addition to the aminimide functional group(s).

As used herein, "monofunctional," when used with respect to the number of aminimide functional groups a particular monomer or polymer comprises, means a monomer or polymer comprising more than zero (0) aminimide functional groups but fewer than two (2) aminimide functional groups, such as, for example, one aminimide functional group per molecule.

As used herein, "bifunctional," when used with respect to the number of aminimide functional groups a particular monomer or polymer comprises, means a monomer or polymer comprising two (2) aminimide functional groups per molecule.

As used herein, "polyfunctional," when used with respect to the number of aminimide functional groups a particular monomer or polymer comprises, means a monomer or polymer comprising more than two (2) aminimide functional groups per molecule.

As used herein, "alkyl" refers to a hydrocarbon chain that may be linear or optionally substituted.

As used herein, "aromatic" refers to a hydrocarbon having a delocalized conjugated π-system with alternating double and single bonds between carbon atoms forming one or more hydrocarbon rings.

As used herein, "cycloaliphatic" refers to a hydrocarbon that comprises one or more hydrocarbon rings that are not aromatic.

As used herein, the term "trivalent nitrogen" refers to a nitrogen atom bound to one further nitrogen atom and two carbon atoms.

As used herein, the term "molecular weight" means the theoretical number average molecular weight ($M_n$) as determined by Gel Permeation Chromatography using Waters 2695 separation module with a Waters 410 differential refractometer (RI detector), polystyrene standards having molecular weights of from approximately 800 g/mol to 900,000 g/mol, tetrahydrofuran (THF) as the eluent at a flow rate of 1 mL/min, and two PG Gel Mixed C columns for separation.

As used herein, the term "volatile" refers to an organic substance having an initial boiling point of less than or equal to 250° C. at a standard atmospheric pressure of 101.3 kPa, whereas the term "non-volatile" refers to any organic substance having an initial boiling point of above 250° C. at a standard atmospheric pressure of 101.3 kPa.

As stated above, disclosed herein are methods of producing an aminimide. More specifically, according to the present invention, the methods of producing an aminimide may comprise, or in some cases may consist of, or in some cases may consist essentially of, reacting (a) an epoxy compound, (b) a hydrazine compound comprising a trivalent nitrogen, and (c) an anhydride-functional material at a temperature greater than 20° C. to form the aminimide, wherein at least one of the epoxy compound and the anhydride-functional material is polymeric. According to the present invention, the methods of producing an aminimide also may comprise, or is some cases may consist of, or in some cases may consist essentially of, reacting (a) an epoxy compound, (b) a hydrazine compound comprising a trivalent nitrogen, and (d) a cyclic compound containing a carbonyl group and at least one heteroatom alpha to the carbonyl group at a temperature greater than 20° C. to form the aminimide, wherein at least one of the epoxy compound and the cyclic compound is polymeric.

Suitable (a) epoxy compounds that may be used to produce the aminimide include monoepoxides, polyepoxides, or combinations thereof.

Suitable monoepoxides that may be used include monoglycidyl ethers of alcohols and phenols, such as phenyl glycidyl ether, n-butyl glycidyl ether, cresyl glycidyl ether, isopropyl glycidyl ether, glycidyl versatate, for example, CARDURA E available from Shell Chemical Co., and glycidyl esters of monocarboxylic acids such as glycidyl neodecanoate, and mixtures of any of the foregoing.

Suitable polyepoxides include polyglycidyl ethers of Bisphenol A, such as Epon® 828 and 1001 epoxy resins, and Bisphenol F diepoxides, such as Epon® 862, which are commercially available from Hexion Specialty Chemicals, Inc. Other useful polyepoxides include polyglycidyl ethers of polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, and combinations thereof.

In addition to the polyepoxides described above, additional polymers containing pendant epoxy groups also may be used to form the aminimide. These polymers may be made by copolymerizing a variety of polymerizable ethylenically unsaturated monomers at least one of which is an epoxy containing monomer, e.g., glycidyl (meth)acrylate or allyl glycidyl ether.

According to the present invention, the molecular weight of the (a) epoxy compound may be at least 44, such as at least 58, and in some cases may be no more than 5000, such as no more than 3000, such as no more than 1000. According to the present invention, the molecular weight of the (a) epoxy compound may be from 44 to 5000, such as from 58 to 3000, such as from 58 to 1000.

According to the present invention, the (a) epoxy compound may have an epoxy equivalent weight (EEW) of at least 44, such as at least 58, and in some cases may be no more than 2500, such as no more than 1500, such as no more than 500. According to the present invention, the (a) epoxy compound may have an EEW of from 44 to 2500, such as from 58 to 1500, such as from 58 to 500. As used herein, EEW refers to the molecular weight of the epoxide compound divided by the number of epoxy groups per molecule.

According to the present invention, useful (b) hydrazine compounds comprising a trivalent nitrogen that can be used to make the aminimide include diamines, i.e. compounds having two amino groups in addition to the hydrazine functional group and may have the formula (II) or formula (III):

(Formula II)

wherein $R_1$ and $R_2$ may be the same or different, and where $R_1$ and $R_2$=alkyl (C1-C10), aliphatic, or cycloaliphatic hydrocarbons; or

(Formula III)

wherein $R_3$ may be

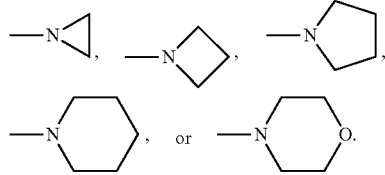

Suitable (b) hydrazine compounds comprising a trivalent nitrogen include 1,1-dimethylhydrazine, 1-amino-piperidine, 1-amino pyrrolidine, or combinations thereof.

According to the present invention, useful (c) anhydride functional materials that may be used to make the aminimide include monofunctional or polyfunctional materials. Suitable anhydride functional materials include hexahydrophthalic anhydride and its derivatives (e.g. methyl hexahydrophthalic anhydride); phthalic anhydride and its derivatives (e.g. methyl phthalic anhydride); succinic anhydride; trimelletic anhydride; pyromelletic dianhydride (PMDA); 3,3',4,4'-oxydiphthalic dianhydride (ODPA); 3,3', 4,4'-benzopherone tetracarboxylic dianhydride (BTDA); 4,4'-diphthalic (hexafluoroisopropylidene) anhydride (6FDA); maleic anhydride and copolymers thereof; or combinations thereof.

According to the present invention, useful (d) cyclic compounds containing a carbonyl group and at least one heteroatom alpha to the carbonyl group that may be used to make the aminimide include caprolactone, caprolactam, ethylene carbonate, propylene carbonate, butylene carbonate, or combinations thereof.

The (d) cyclic ester compound may have the formula (IV):

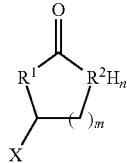

wherein $R_4$ is O or C, $R_5$ is O, S, or N, n=0 or 1, m=1-3, X=H or $(CH_2)_p CH_3$, and p=0-15.

According to the present invention, a molar ratio of the (a) epoxy compound to the (b) hydrazine compound comprising the trivalent nitrogen may be at least 0.5:1 such as at least 0.6:1, such as at least 0.7:1, and in some cases may be no more than 1:0.5, such as no more than 1:0.6, such as no more than 1:0.7. According to the present invention, the molar ratio of the (a) epoxy compound to the (b) hydrazine compound comprising the trivalent nitrogen may be from 1:0.5 to 0.5:1, such as from 1:0.6 to 0.6:1, such as from 1:0.7 to 0.7:1.

According to the present invention, a molar ratio of the (c) anhydride functional material to the (b) hydrazine compound comprising the trivalent nitrogen may be at least 0.7:1, such as at least 0.8:1, such as at least 0.9:1, and in some cases may be no more than 1:0.7, such as no more than 1:0.8, such as no more than 1:0.9. According to the present invention, the molar ratio of the (c) anhydride functional material to the (b) hydrazine compound comprising the trivalent nitrogen may be from 1:0.7 to 0.7:1, such as from 1:0.8 to 0.8:1, such as from 1:0.9 to 0.9:1.

According to the present invention, a molar ratio of the (d) cyclic compound to the (b) hydrazine compound comprising the trivalent nitrogen may be at least 0.7:1, such as at least 0.8:1, such as at least 0.9:1, and in some cases may be no more than 1:0.7, such as no more than 1:0.8, such as no more than 1:0.9. According to the present invention, a molar ratio of the (d) cyclic compound to the (b) hydrazine compound comprising the trivalent nitrogen may be from 1:0.7 to 0.7:1, such as from 1:0.8 to 0.8:1, such as from 1:0.9 to 0.9:1.

The aminimide formed according to the present invention is polymeric and may comprise at least one aminimide functional group, i.e., the aminimide may be monofunctional, bifunctional, or polyfunctional with respect to aminimide functionality. In addition, the aminimide may comprise at least one functional group in addition to the aminimide functional group, such as an acid functional group, an hydroxyl functional group, an amine functional group, a mercapto functional group, or combinations thereof.

Due to the use of the (c) anhydride functional material or the (d) cyclic compound, the aminimide formed according to the present invention may be substantially free, or in some cases, completely free, of any alkanol, and may be useful, for example, in compositions that are 100% solid, such as, for example, powder coatings, adhesives, and the like.

Optionally, according to the present invention, the (a) epoxy compound, (b) hydrazine compound comprising a trivalent nitrogen, and (c) anhydride functional material may be reacted in the presence of (e) a diluent to form the aminimide. Optionally, according to the present invention, the (a) epoxy compound, (b) hydrazine compound comprising a trivalent nitrogen, and (d) cyclic compound may be reacted in the presence of (e) a diluent to form the aminimide. The (e) diluent, according to the present invention, either may be non-volatile or may be volatile and removed by distillation under atmospheric conditions and below 250° C. Suitable non-volatile diluents that may be used include poly-tetrahydrofuran, polyethylene glycol, polypropylene glycol, or combinations thereof. Suitable volatile diluents that may be used include Dowanol PM, tert-butanol, isopropanol, or combinations thereof.

According to the present invention, the aminimide may be formed by reacting (a) the epoxy compound, (b) the hydrazine compound comprising a trivalent nitrogen, and (c) the anhydride function material according to at least one of the following reactions:

(Reaction I):

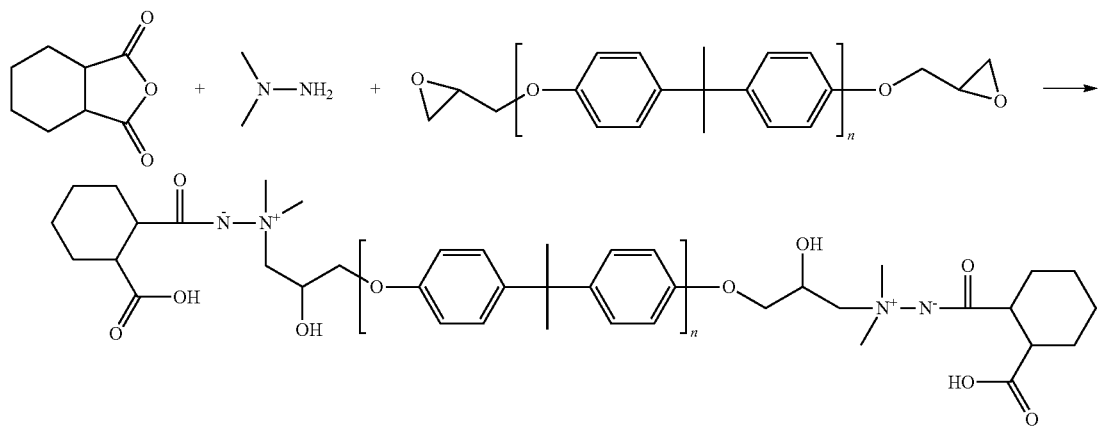

wherein n≥3; and/or (Reaction II):

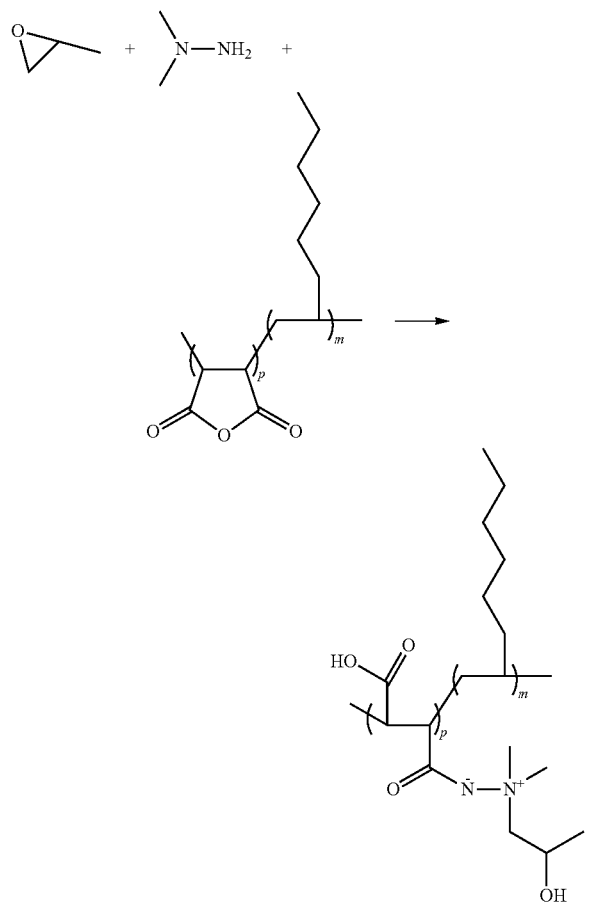

wherein p≥2.4 and m≥4.3.

According to the present invention, the process for making an aminimide may begin by combining the (a) epoxy compound, the (b) hydrazine compound comprising a trivalent nitrogen, and the (c) anhydride functional material and mixing the components at a temperature of at least 20° C. in an inert gas atmosphere, e.g. a nitrogen environment. The mixture then may be heated to an elevated temperature, such as at least 20° C., such as at least 60° C., such as at least 80° C., and in some cases to no higher than 150° C., such as no higher than 120° C., such as no higher than 100° C., and held for a sufficient period of time to react the (a) epoxy compound and the (b) hydrazine compound to form an intermediate reaction mixture. In some instances, the mixture then may be heated to an elevated temperature, such as from 20° C. to 150° C., such as from 60° C. to 120° C., such as from 80° C. to 100° C., and held for a sufficient period of time to react the (a) epoxy compound and the (b) hydrazine compound comprising a trivalent nitrogen to form an intermediate reaction mixture.

Next, according to the present invention, the intermediate reaction mixture may be reacted with the (c) anhydride functional material at an elevated temperature, such as at least 20° C., such as at least 30° C., such as at least 60° C., and in some cases to no higher than 150° C., such as no higher than 120° C., such as no higher than 100° C., and held for a sufficient period of time to form the aminimide. In some instances, the intermediate reaction mixture may be reacted with the (c) anhydride functional material at an elevated temperature, such as from 20° C. to 150° C., such as from 30° C. to 120° C., such as from 40° C. to 100° C., and held for a sufficient period of time to form the aminimide.

According to the present invention, the temperature and period of time for reacting the (a) epoxy compound and the (b) hydrazine compound may vary, depending upon the exact reaction conditions and the presence or absence of additional ingredients such as, for example, (e) the diluent, but generally the time period can be determined by analyzing the contents of the reaction vessel by determining MEQ amine (milliequivalents amine; based on ASTM 0358, using PPG internal Standard Test method, in which a sample is dissolved in acetic acid and titrated potentiometrically with 0.1N acetous perchloric acid) to confirm the absence of trivalent nitrogen. According to the present invention, this "sufficient period of time" to form the intermediate reaction mixture may be, in some cases, at least 1 hour, such as at least 4 or 8 hours, and in some cases may be no more than 48 hours, such as no more than 24 or 12 hours. According to the present invention, the "sufficient period of time" to form the intermediate reaction mixture may be from about 1 hour to 48 hours, such as from 8 hours to 24 hours or from 4 to 12 hours.

According to the present invention, the temperature and period of time for reacting the intermediate reaction product and the (c) anhydride functional material also may vary, depending upon the exact reaction conditions and the presence or absence of additional ingredients such as, for example, the (e) diluent, but generally the time period can be determined by analyzing the contents of the reaction vessel using known spectroscopic techniques such as infrared spectrometry to confirm the presence of the aminimide. According to the present invention, this "sufficient period of time" to form that aminimide may be, in some cases, at least 1 hour, such as at least 4 hours, and in some cases may be no more than 20 hours, such as no more than 8 hours. According to the present invention, the "sufficient period of time" to form the aminimide may be from about 1 hour to 20 hours, such as from 4 hours to 8 hours.

According to the present invention, after completion of the reaction, the reaction mixture may be concentrated by separating a solid from a liquid phase such that all that remains in the reaction vessel is the aminimide According to the present invention, the (e) diluent optionally may be removed from the reaction vessel by distillation at either atmospheric pressure or at a reduced pressure using a vacuum pump.

Also disclosed according to the present invention is an aminimide represented by one of the formulae V, VI, or a combination thereof:

(formula V)

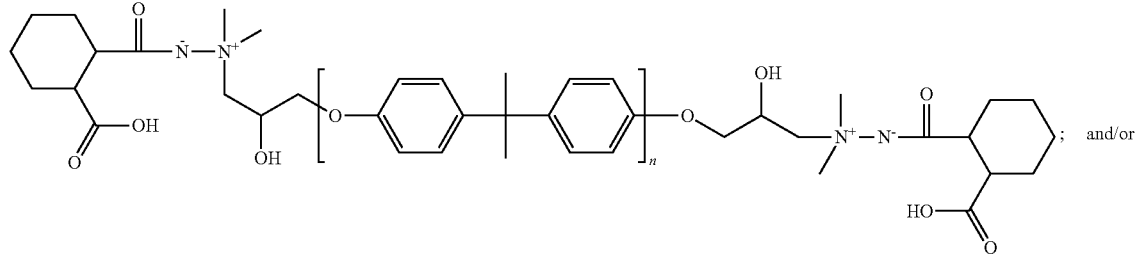

; and/or (formula VI)

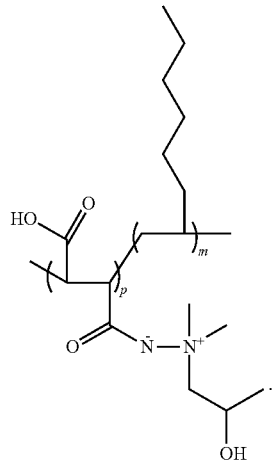

According to the present invention, the aminimide may be formed by reacting (a) the epoxy compound, (b) the hydrazine compound comprising a trivalent nitrogen, and (d) the cyclic compound containing a carbonyl group and at least one heteroatom alpha to the carbonyl group according to at least one of the following reactions:

(Reaction III):

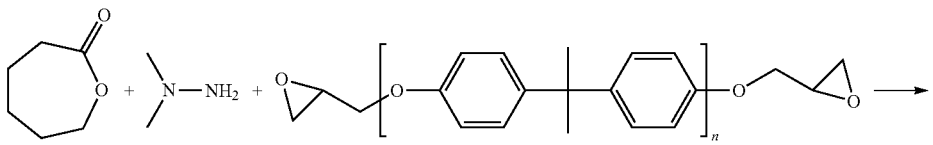

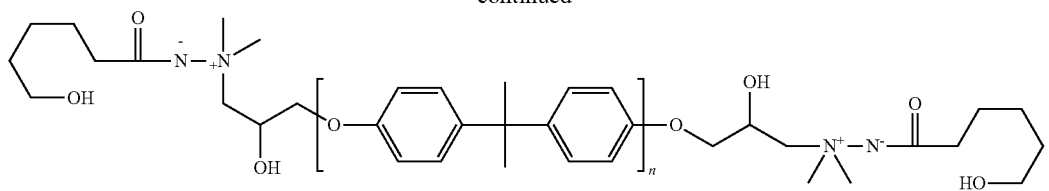
(Reaction IV):
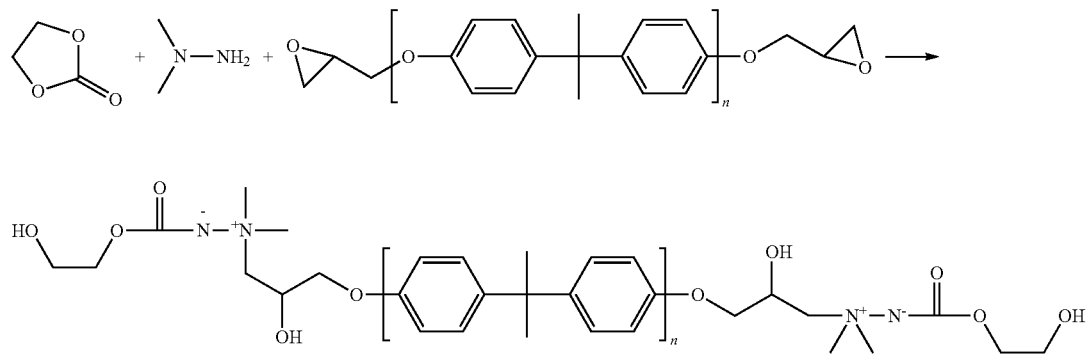
(Reaction V):
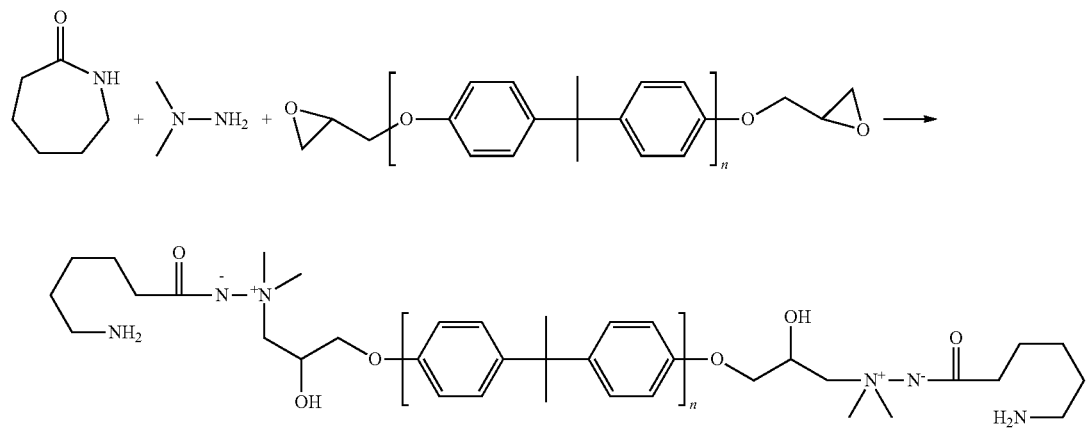
(Reaction VI):
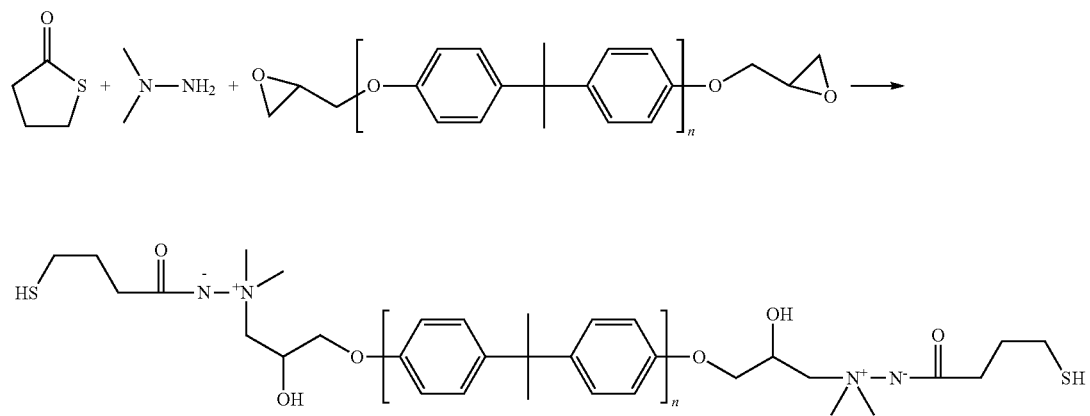

wherein n≥3; and/or (Reaction VII):

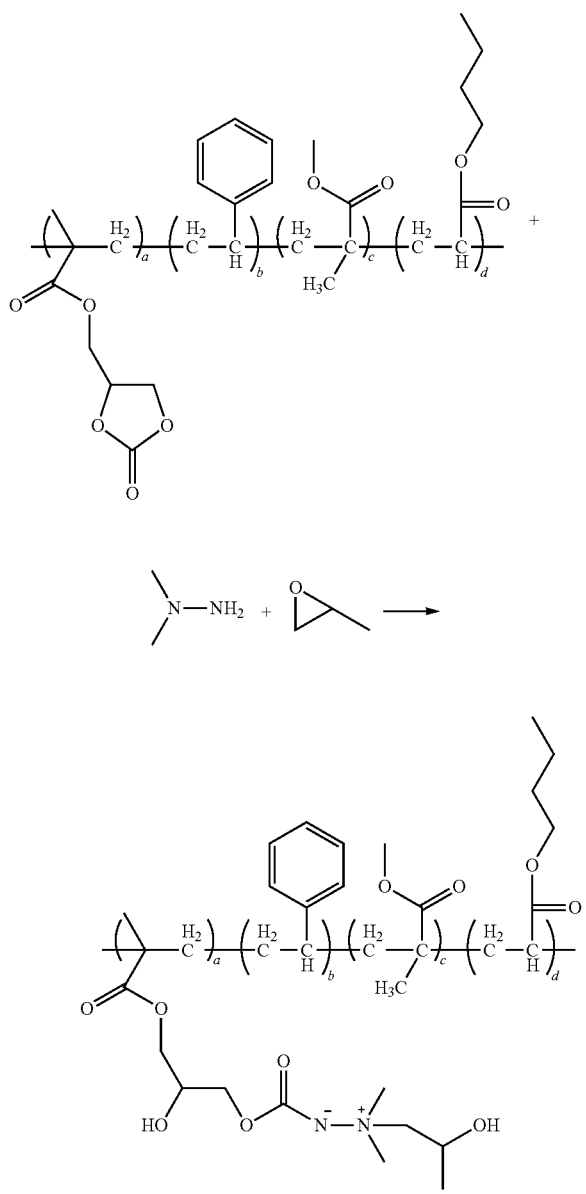

wherein a, b, c, and d each independently are ≥3.

The process for making an aminimide begins by combining the (a) epoxy compound, the (b) hydrazine compound comprising a trivalent nitrogen, and the (d) the cyclic compound containing a carbonyl group and at least one heteroatom alpha to the carbonyl group and mixing the components at a temperature of at least 20° C. in a nitrogen environment. The mixture may then heated to an elevated temperature, such as at least 20° C., such as at least 60° C., such as at least 80° C., and in some cases to no higher than 150° C., such as no higher than 120° C., such as no higher than 100° C., and held for a sufficient period of time to react the (a) epoxy compound and the (b) hydrazine compound to form an intermediate reaction mixture. In some instances, the mixture may be heated to an elevated temperature, such as from 20° C. to 150° C., such as from 60° C. to 120° C., such as from 80° C. to 100° C., and held for a sufficient period of time to react the (a) epoxy compound and the (b) hydrazine compound comprising a trivalent nitrogen to form an intermediate reaction mixture.

Next, according to the present invention, the intermediate reaction mixture may be reacted with the (d) cyclic compound containing a carbonyl group and at least one heteroatom alpha to the carbonyl group at an elevated temperature, such as at least 30° C., such as at least 50° C., such as at least 70° C., and in some cases no higher than 150° C., such as no higher than 120° C., such as no higher than 90° C., and held for a sufficient period of time to react the (a) epoxy compound and the (b) hydrazine compound to form the aminimide. In some instances, the intermediate mixture may be reacted with the (d) cyclic compound containing a carbonyl group and at least one heteroatom alpha to the carbonyl group at an elevated temperature, such as from 30° C. to 150° C., such as from 50° C. to 120° C., such as from 70° C. to 90° C., and held for a sufficient period of time to form the aminimide material.

The temperature and period of time for reacting the (a) epoxy compound and the (b) hydrazine compound may vary, depending upon the exact reaction conditions and the presence or absence of additional ingredients such as, for example, the (e) diluent, but generally the time period can be determined by analyzing the contents of the reaction vessel by determining MEQ amine (based on ASTM 0358, using PPG internal Standard Test method, in which a sample is dissolved in acetic acid and titrated potentiometrically with 0.1N acetous perchloric acid) to confirm the absence of the (b) hydrazine compound comprising a trivalent nitrogen. This "sufficient period of time" to form the intermediate reaction mixture may be, in some instances, at least 1 hour, such as at least hours, and in some instances may be not more than 48 hours, such as not more than 24 hours, and in some instances, may be from 1 hour to 48 hours, such as from 8 hours to 24 hours.

The temperature and period of time for reacting the intermediate reaction product and the (d) cyclic compound also may vary, depending upon the exact reaction conditions and the presence or absence of additional ingredients such as, for example, the (e) diluent, but generally the time period can be determined by analyzing the contents of the reaction vessel using known spectroscopic techniques such as infrared spectrometry to confirm the presence of the aminimide. This "sufficient period of time" may be, in some instances, at least 1 hour, such as at least 4 hours, and in some instances may be no more than 20 hours, such as no more than 8 hours, and in some instances may be from about 1 hour to 20 hours, such as from 4 hours to 8 hours.

After completion of the reaction, according to the present invention, the reaction mixture may be concentrated by separating a solid from a liquid phase such that all that remains in the reaction vessel is the aminimide Optionally, according to the present invention, the diluent may be removed from the reaction vessel by distillation at either atmospheric pressure or at a reduced pressure using a vacuum pump.

Also disclosed according to the present invention is an aminimide represented by one of formulae VII to XI or combinations thereof:

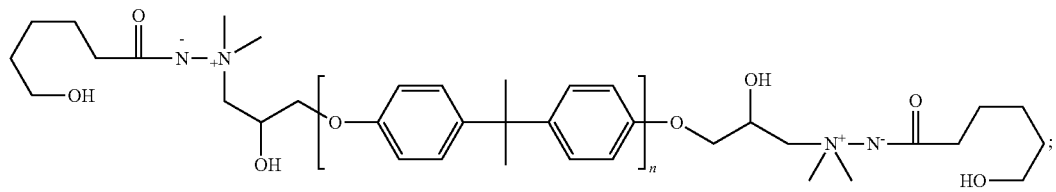
(formula VII)
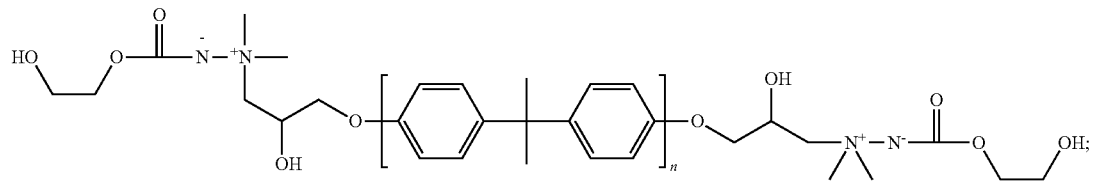
(formula VIII)
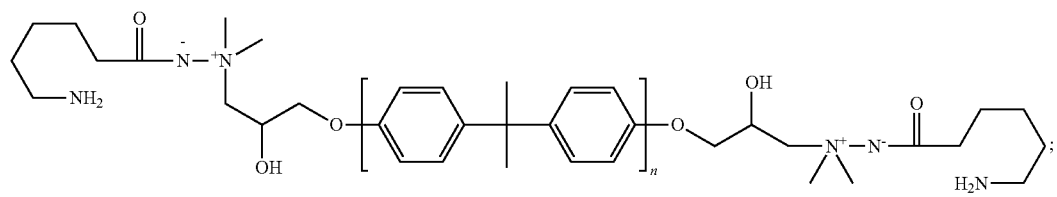
(formula IX)
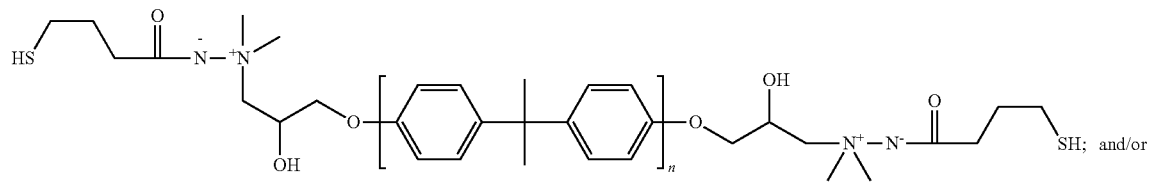
(formula X); and/or
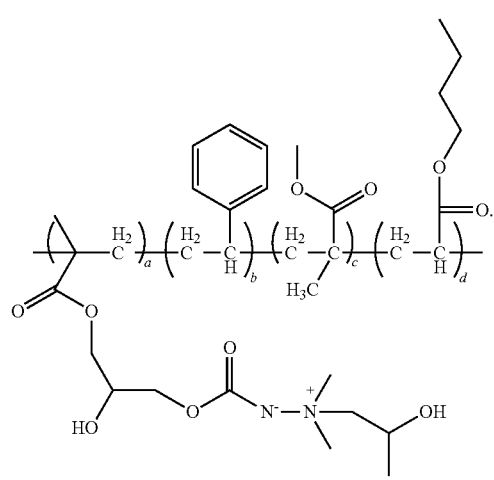
(formula XI)

Whereas particular embodiments have been described above for purposes of illustration, it will be evident to those skilled in the art that numerous variations of the details of the coating composition, coating, and methods disclosed herein may be made without departing from the scope in the appended claims.

The following specific examples are provided merely for illustration purposes only, and are not intended to be limiting unless otherwise specified.

EXAMPLES

The following Examples A-F provide descriptions of the synthesis of aminimides, as described in further detail herein. In each Example, the final powder was ground with a mortar and pestle, and then was shaken on a sieve shaker (Retsch AS 300) at an amplitude of 1 mm/g and a sieve of <125 μm.

Example A

Into a 500-milliliter, 4-necked kettle equipped with a stirrer, a condenser, a nitrogen inlet, and a thermocouple in a heating mantle, was charged 25.81 grams of 1,1-dimethylhydrazine (62% solution) (available from Lonza), 238.5 grams of Epon 1001 (75% in xylene) (available from Momentive), 100 grams of isopropanol and 20 grams of Dowanol PM (available from Dow Chemical). Agitation and a nitrogen flow of 0.2 scft/min (where "scft" designates standard cubic feet) were started. The mixture was first stirred at 20° C. for 1 hour and then at 55° C. for 5 hours. The reaction progress was monitored by amine MEQ (as determined by ASTM D4370, using 716 DMS Titrino from Brinkmann) When amine MEQ stalled, 41.0 grams of hexahydrophthalic anhydride (HHPA; available from Milliken Chemical) were added into the reaction mixture. The reaction mixture was heated to 80° C. until the anhydride peaks (1867 cm$^{-1}$ and 1787 cm$^{-1}$) disappeared and the aminimide peak (1579 cm$^{-1}$) was generated, as measured by infrared spectroscopy (IR spectrometer, ThermoScientific Nicolet iS5 FT-IR).[1] After completion of the reaction, the reaction mixture was concentrated by evaporation of the solvent under vacuum. The residual liquid was poured out onto aluminum foil and formed a solid at room temperature. The solid was ground into fine powder (<125 μm).

[1] The infrared spectra of acylaminimides show a strong absorption in the 1555 cm$^{-1}$ to 1600 cm$^{-1}$ region, which is assigned to the stretching frequency of the N=C—O$^-$ bond.

Example B

Into a 500-milliliter, 4-necked kettle equipped with a stirrer, a condenser, a nitrogen inlet, and a thermocouple in a heating mantle, was charged 25.81 grams of 1,1-dimethylhydrazine (62% solution), 238.5 grams of Epon 1001 (75% in xylene), and 103 grams of Dowanol PM. Agitation and a nitrogen flow of 0.2 scft/min were started. The mixture was first stirred at 20° C. for 1 hour and then at 80° C. for 8 hours. The reaction progress was monitored by amine MEQ (as determined by ASTM D4370, using 716 DMS Titrino from Brinkmann) When amine MEQ stalled, 30.3 grams of ε-caprolactone (available from BASF Corp.) were added into reaction mixture at 50° C. The reaction mixture was heated to 80° C. until the ε-caprolactone peak (1775 cm$^{-1}$) disappeared and the aminimide peak (1580 cm$^{-1}$) was generated, as measured by infrared spectroscopy (IR spectrometer, ThermoScientific Nicolet iS5 FT-IR). After completion of the reaction, the reaction mixture was concentrated by evaporation of solvent under vacuum. The residual liquid was poured out onto aluminum foil and formed a solid at room temperature. The solid was ground into fine powder (<125 μm).

Example C

Maleic anhydride 1-octadecene copolymer was made from 30% maleic anhydride (available from Ashland Inc.) and 70% 1-octadecene (available from Aldrich) under polymerization conditions in butyl acetate as solvent ($M_n$ approximately 1273 g/mol).

Into a 500-milliliter, 4-necked kettle equipped with a stirrer, a condenser, a nitrogen inlet, and a thermocouple in a heating mantle, was charged 32.31 grams of 1,1-dimethylhydrazine (62% solution), 19.36 grams of propylene oxide (available from Sigma Aldrich), and 61.40 grams of Dowanol PM. Agitation and a nitrogen flow of 0.2 scft/min were started. The mixture was first stirred at 20° C. for 1 hour and then at 50° C. for 5 hours. The reaction progress was monitored by amine MEQ (as determined by ASTM D4370, using 716 DMS Titrino from Brinkmann) When amine MEQ stalled, 147.5 grams of maleic anhydride 1-octadecene copolymer (solid 71%, made as described above) were added into reaction mixture at 50° C. The reaction mixture was heated to 80° C. until the anhydride peaks (1867 cm$^{-1}$ and 1787 cm$^{-1}$) disappeared, and the aminimide peak (1568 cm$^{-1}$) was generated, as measured by infrared spectroscopy (IR spectrometer, ThermoScientific Nicolet iS5 FT-IR). After completion of the reaction, the reaction mixture was concentrated by evaporation of solvent under vacuum. The residual liquid was poured out onto aluminum foil and formed a solid at room temperature. The solid was ground into fine powder (<125 μm).

Example D

Into a 500-milliliter, 4-necked kettle equipped with a stirrer, a condenser, a nitrogen inlet, and a thermocouple in a heating mantle, was charged 25.81 grams of 1,1-dimethylhydrazine (62% solution), 238.5 grams of Epon 1001 (75% in xylene), 103.2 grams of Dowanol PM. Agitation and a nitrogen flow of 0.2 scft/min ("scft" means standard cubic feet) were started. The mixture was first stirred at 20° C. for 1 h, and then at 80° C. for 9 h. The reaction progress was monitored by amine MEQ (as determined by ASTM D4370, using 716 DMS Titrino from Brinkmann) When amine MEQ was stalled, the reaction mixture was cooled to 50° C. and then 23.4 grams of ethylene carbonate (available from Huntsman) were added into reaction mixture at 50° C. The reaction mixture was heated to 80° C. and held at 80° C. until the carbonate peaks (1803 cm$^{-1}$ and 1776 cm$^{-1}$) disappeared and the aminimide peak (1606 cm$^{-1}$) was generated, as measured by infrared spectroscopy (IR spectrometer, ThermoScientific Nicolet iS5 FT-IR). After completion of the reaction, the reaction mixture was concentrated by evaporation under vacuum. The residual liquid was poured out onto aluminum foil and formed a solid at room temperature. The solid was ground into fine powder (<125 μm).

Example E

Into a 500-milliliter, 4-necked kettle equipped with a stirrer, a condenser, a nitrogen inlet, and a thermocouple in a heating mantle, was charged 25.81 grams of 1,1-dimethylhydrazine (62% solution), 238.5 grams of Epon 1001 (75% in xylene), and 103.2 grams of Dowanol PM. Agitation and a nitrogen flow of 0.2 scft/min were started. The mixture was first stirred at 20° C. for 1 h, and then at 80° C. for 6 h. The reaction progress was monitored by amine MEQ (as determined by ASTM D4370, using 716 DMS Titrino from Brinkmann). When amine MEQ was stalled, the reaction mixture was cooled to 50° C. and then 30.1 grams of ε-caprolactam (available from DSM Fine Chemicals) were added into reaction mixture at 50° C. The reaction mixture was heated to 80° C. and held at 80° C. until the ε-caprolactam peak (1658 cm$^{-1}$) disappeared and the aminimide peak was generated (1581 cm$^{-1}$), as measured by infrared spectroscopy (IR spectrometer, ThermoScientific Nicolet iS5 FT-IR). After completion of the reaction, the reaction mixture was concentrated by evaporation under vacuum. The residual liquid was poured out onto aluminum foil and formed a solid at room temperature. The solid was ground into fine powder (<125 μm).

Example F

Into a 500-milliliter, 4-necked kettle equipped with a stirrer, a condenser, a nitrogen inlet, and a thermocouple in a heating mantle, was charged 9.68 grams of 1,1-dimethylhydrazine (62% solution), 89.4 grams of Epon 1001 (75% in xylene), and 38.7 grams of Dowanol PM. Agitation and a nitrogen flow of 0.2 scft/min were started. The mixture was first stirred at 20° C. for 1 h, and then at 80° C. for 4 h. The reaction progress was monitored by amine MEQ (as determined by ASTM D4370, using 716 DMS Titrino from Brinkmann) When the amine MEQ was stalled, reaction mixture was cooled to 50° C. and then 10.2 grams of γ-thiobutyrolactone (available from Sigma Aldrich) were added into reaction mixture at 50° C. The reaction mixture was heated to 80° C. and held at 80° C. until the lactone peak (1756 cm$^{-1}$) disappeared and the aminimide peak was generated (1581 cm$^{-1}$), as measured by infrared spectroscopy (IR spectrometer, ThermoScientific Nicolet iS5 FT-IR). After completion of the reaction, the reaction mixture was concentrated by evaporation under vacuum. The residual liquid was poured out onto aluminum foil and formed a solid at room temperature. The solid was grinded into fine powder (<125 μm).

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

ASPECTS OF THE INVENTION

1. A method of preparing an aminimide comprising:
    reacting an (a) epoxy compound, a (b) hydrazine compound comprising a trivalent nitrogen, and an (c) anhydride functional material at a temperature greater than 20° C. to form the aminimide material, wherein at least one of the (a) epoxy compound and the (c) anhydride functional material is polymeric.
2. The method of aspect 1, wherein the (c) anhydride functional material comprises a copolymer of octene maleic anhydride, decene maleic anhydride, octadecene maleic anhydride, or combinations thereof.
3. The method of aspects 1 or 2, wherein a molar ratio of the (c) anhydride functional material to the (b) hydrazine compound is from 1:0.7 to 0.7:1.
4. The method of any of aspects 1 to 3, wherein the (a) epoxy compound, the (b) hydrazine compound, and the (c) anhydride functional material are reacted in a (e) diluent.
5. The method of any of aspects 1 to 4, wherein the aminimide is substantially free of alkanol.
6. A method of preparing an aminimide comprising:
    reacting an (a) epoxy compound, a (b) hydrazine compound comprising a trivalent nitrogen, and a (d) cyclic compound comprising a carbonyl group and at least one heteroatom alpha to the carbonyl group at a temperature greater than 20° C. to form the aminimide, wherein at least one of the (a) epoxy compound and the (d) cyclic compound is polymeric.
7. The method of aspect 6, wherein the (d) cyclic compound has the formula (I):

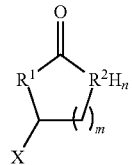

wherein R$^1$ is O or C, R$^2$ is O, S, or N, n=0 or 1, m=1-3, X=H or (CH$_2$)$_p$CH$_3$, and p=0-15.
8. The method of aspects 6 or 7, wherein the (d) cyclic compound comprises caprolactone, caprolactam, ethylene carbonate, propylene carbonate, butylene carbonate, or combinations thereof.
9. The method of any of aspects 6 to 8, wherein a molar ratio of the (d) cyclic compound to the (b) hydrazine compound is from 1:0.7 to 0.7:1.
10. The method of any of aspects 6 to 9, wherein the (a) epoxy compound, the (b) hydrazine compound, and the (d) cyclic compound are reacted in a (e) diluent.
11. The method of any of the preceding aspects, wherein the (b) hydrazine compound comprises 1-amino-piperidine, 1,1-dimethyl hydrazine, 1-amino pyrrolidine, or a combination thereof.
12. The method of any of the preceding aspects, wherein a molar ratio of the (a) epoxy compound to the (b) hydrazine compound is from 1:0.5 to 0.5:1.
13. The method of any of the preceding aspects, wherein the aminimide comprises an acid functional group.
14. The method of any of the preceding aspects, further comprising separating a solid from a liquid phase.
15. An aminimide prepared according to the method of any of the preceding aspects.

16. The aminimide of aspect 15, wherein the aminimide is represented by one of the following formulae:
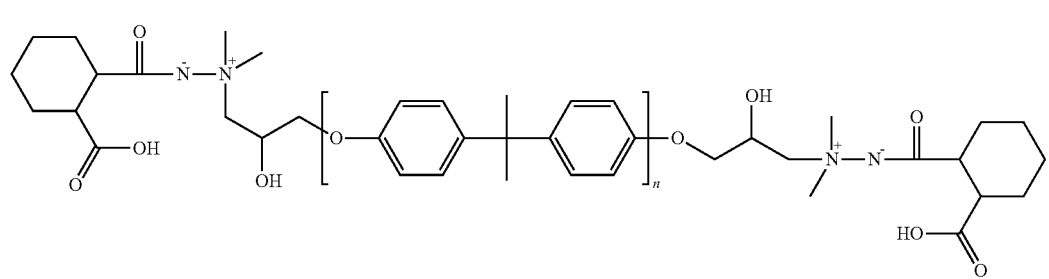
(V)
wherein n is ≥3;
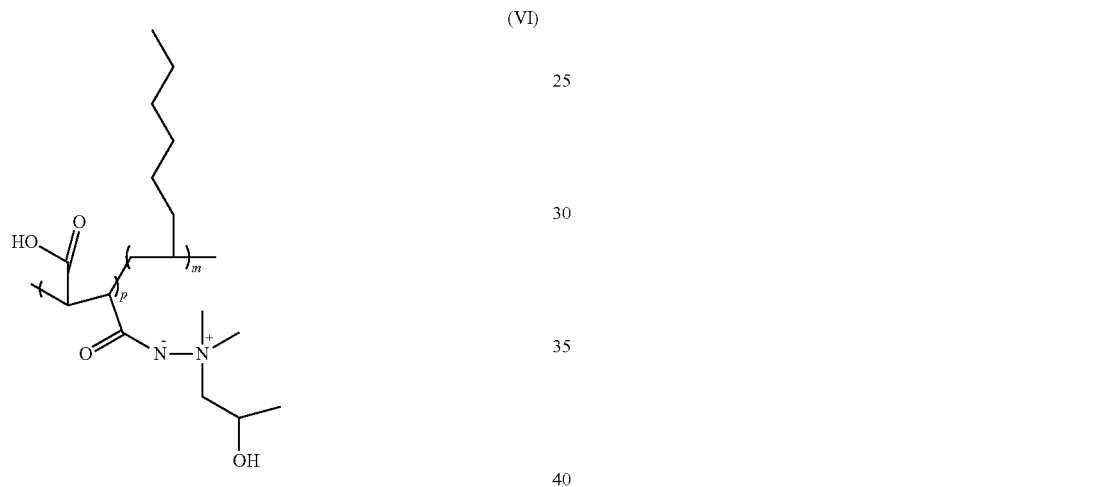
(VI)
wherein p is ≥2.4 and m is ≥4.3;
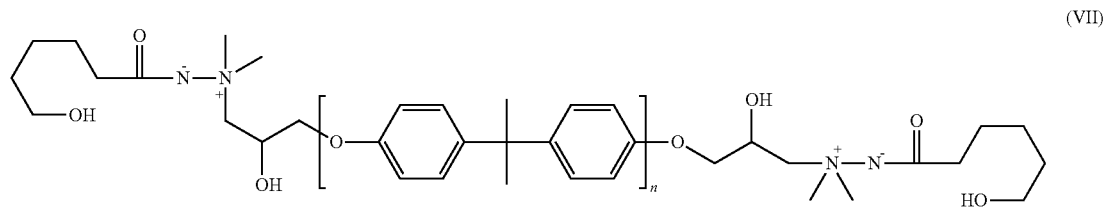
(VII)
wherein n is ≥3;
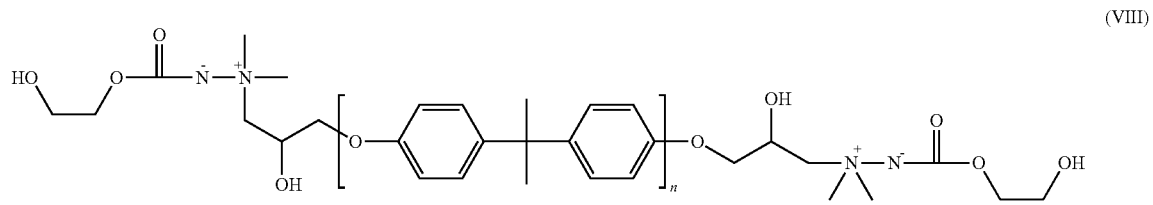
(VIII)

wherein n is ≥3;

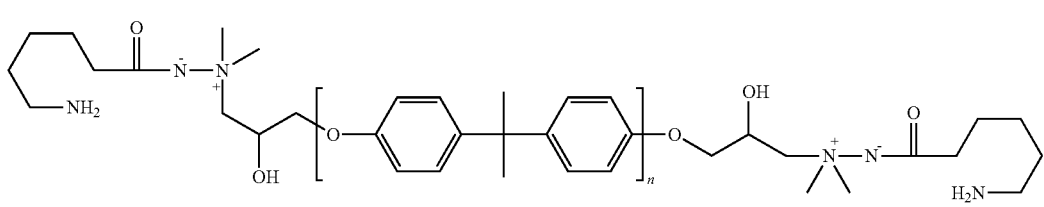
(IX)

wherein n is ≥3;

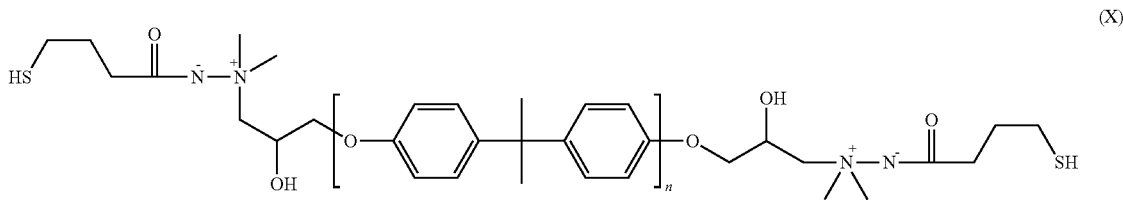
(X)

wherein n is ≥3; or

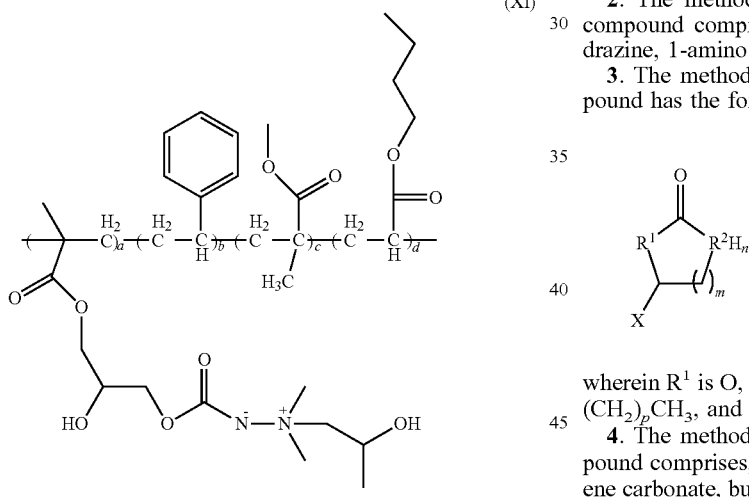
(XI)

wherein a, b, c, and d each independently are ≥3.

We claim:

1. A method of preparing an aminimide comprising:
reacting an (a) epoxy compound, a (b) hydrazine compound comprising a trivalent nitrogen, and a (d) cyclic compound containing a carbonyl group and at least one heteroatom of nitrogen or sulfur alpha to the carbonyl group, or a first heteroatom alpha to the carbonyl group that is oxygen and a second heteroatom alpha to the carbonyl group that is oxygen, nitrogen or sulfur, at a temperature greater than 20° C. to form the aminimide, wherein at least one of the (a) epoxy compound and the (d) cyclic compound is polymeric, wherein the aminimide comprises an aminimide functional group and at least one additional functional group selected from the group consisting of an acid functional group, a hydroxyl functional group, an amine functional group, a mercapto functional group and combinations thereof.

2. The method of claim 1, wherein the (b) hydrazine compound comprises 1-amino-piperidine, 1,1-dimethylhydrazine, 1-amino pyrrolidine, or a combination thereof.

3. The method of claim 1, wherein the (d) cyclic compound has the formula (I):

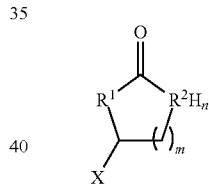

wherein $R^1$ is O, $R^2$ is O, S, or N, n=0 or 1, m=1-3, X=H or $(CH_2)_pCH_3$, and p=0-15.

4. The method of claim 1, wherein the (d) cyclic compound comprises, caprolactam, ethylene carbonate, propylene carbonate, butylene carbonate, or combinations thereof.

5. The method of claim 1, wherein a molar ratio of the (a) epoxy compound to the (b) hydrazine compound is from 1:0.5 to 0.5:1.

6. The method of claim 1, wherein a molar ratio of the (d) cyclic compound to the (b) hydrazine compound is from 1:0.7 to 0.7:1.

7. The method of claim 1, wherein the (a) epoxy compound, the (b) hydrazine compound, and the (d) cyclic compound are reacted in a (e) diluent.

8. The method of claim 1, wherein the aminimide comprises an acid functional group.

9. The method of claim 1, further comprising separating a solid from a liquid phase.

10. An aminimide prepared according to the method of claim 1.

* * * * *